United States Patent [19]
Worbois et al.

[11] 4,013,322
[45] Mar. 22, 1977

[54] BRAKE APPARATUS PROVIDING PERMANENT SUPPRESSION OF A TRAIN CONTROL BRAKE APPLICATION

[75] Inventors: Robert J. Worbois, N. Huntingdon Township; John R. Reiss, N. Versailles Township, both of Pa.

[73] Assignee: Westinghouse Air Brake Company, Wilmerding, Pa.

[22] Filed: June 8, 1976

[21] Appl. No.: 693,744

[52] U.S. Cl. .................................. 303/18; 303/14
[51] Int. Cl.² ........................................ B60T 7/16
[58] Field of Search .............................. 303/14–16, 303/18–20

[56] References Cited
UNITED STATES PATENTS

| | | | |
|---|---|---|---|
| 2,166,007 | 7/1939 | Hewitt et al. | 303/19 |
| 2,322,042 | 6/1943 | McClure | 303/18 |
| 3,076,681 | 2/1963 | Erson et al. | 303/18 |

*Primary Examiner*—Duane A. Reger
*Attorney, Agent, or Firm*—W. F. Poore; R. W. McIntire, Jr.

[57] ABSTRACT

This invention relates to a railway locomotive brake control apparatus operably either manually by an engineer or automatically in response to a change in a train control signal indication to a more restrictive indication to effect a brake application on the locomotive and a train of cars hauled thereby unless the automatic train control brake application is suppressed by the engineer manually effecting a full service brake application. When the engineer thus manually effects a full service brake application upon the occurrence of the more restrictive signal indication, the fluid under pressure released from the train brake pipe to cause this brake application is used to temporarily suppress the automatic train control brake application so long as fluid under pressure is being released from the train brake pipe to atmosphere via a restriction. Thereafter, the fluid under pressure supplied to brake cylinders to effect the brake application automatically effects a permanent suppression of the automatic train control brake application.

9 Claims, 2 Drawing Figures

Fig. 1B

BRAKE APPARATUS PROVIDING PERMANENT SUPPRESSION OF A TRAIN CONTROL BRAKE APPLICATION

BACKGROUND OF THE INVENTION

U.S. Pat. No. 3,076,681 issued Feb. 5, 1963 to Erik G. Erson et al., assigned to the assignee of the present invention, discloses a locomotive fluid pressure brake apparatus wherein a temporary suppression of an automatic train control brake application is provided as the engineer moves a handle of an engineer's automatic brake valve device from a release position into an application zone and thence to a full service position after which the engineer may manually effect a permanent suppression of the automatic train control brake application by moving the handle from its full service position selectively to a suppression, handle off or emergency position. Such manually obtainable successive temporary and permanent suppression of an automatic train control brake application necessitates that the locomotive be provided with a brake valve device having the necessary apparatus to effect the desired results upon movement of the handle of the brake valve device to each of its several positions. It is apparent that such a brake valve is necessarily large, complicated in its construction and, therefore, expensive.

Accordingly, it is the general purpose of the present invention to provide a railway locomotive brake apparatus that embodies a small, simple and inexpensive valve device and a number of other simple and inexpensive valve devices, some of which are identical and are carried in large quantities in locomotive builder's storerooms. These several valve devices are so connected together by conduits as to enable the engineer by releasing fluid under pressure from the train brake pipe to suppress an automatic train control brake application by use of this fluid under pressure so long as it is being released from the train pipe to atmosphere via a restriction. Thereafter, the brake cylinder pressure developed as the result of this reduction of brake pipe pressure automatically provides a permanent suppression of the train control brake application until a brake release is manually effected by the engineer upon the track signal changing to clear.

SUMMARY OF THE INVENTION

According to the present invention, a locomotive brake control apparatus has embodied therein a simple and inexpensive brake valve device for controlling the operation of a relay valve device to effect the supply of fluid under pressure to and the release of fluid under pressure from a train brake pipe the variation of the pressure in which causes control valve devices on the locomotive and cars hauled thereby to effect the supply of fluid under pressure to and the subsequent release of fluid under pressure from brake cylinders on the locomotive and cars.

The fluid under pressure released from the train brake pipe by the relay valve device is vented to atmosphere via a choke and is also supplied via one inlet of a double check valve device to a fluid pressure operated valve device that is operated thereby to prevent operation of a brake application valve device, in response to a change to a more restrictive signal indication, to cause an automatic train control brake application. Since the one inlet of the double check valve device is open to atmosphere via the choke, the locomotive brake cylinder is connected to the other inlet of this valve device to automatically provide a permanent suppression of the train control brake application as the result of the engineer, upon the occurrence of a change in a train control track signal indication to a more restricted indication, manually operating the brake valve device to effect a full reduction of the train brake pipe pressure to cause the control valve devices on the locomotive and cars to effect the supply of fluid under pressure to the corresponding brake cylinders thereby effecting a full service brake application on the entire train.

DESCRIPTION

Referring to the drawings, the locomotive fluid pressure brake control apparatus embodying the invention comprises a brake pipe 1 that extends from end to end of the locomotive and back through each car in a train hauled thereby, a brake cylinder 2, a main reservoir 3, a control reservoir 4, a selector volume reservoir 5, a timing reservoir 6, an equalizing reservoir 7, an engineer's brake valve device 8 for controlling the pressure in the equalizing reservoir 7, a fluid pressure operated relay valve device 9 for controlling the pressure in the brake pipe 1 in accordance with variations of the pressure in the equalizing reservoir 7, a brake control valve device 10 connected to the brake pipe 1 by a branch pipe 11 and controlled by variations in pressure therein, to effect the supply of fluid under pressure to and from a brake cylinder relay valve device 12 which is operated thereby to effect the supply of fluid under pressure to and from the brake cylinder 2, a brake application valve device 13, a train control or timing valve device 14, a suppression valve device 15, a three-way cut-out valve device 16 manually operative to cut out train control when the locomotive is not the lead unit in multiple unit operation or is a pusher, a pair of double check valve devices 17 and 18, a brake pipe charging cut-off valve device 19 interposed between the relay valve device 9 and the brake pipe 1, a charging cut-off pilot valve device 20 operative in response to a reduction of pressure in the brake pipe 1 at an emergency rate to effect the supply of fluid under pressure from the main reservoir 3 to the charging cut-off valve device 19 to cause operation of this valve device 19 to cut off the supply of fluid under pressure from the relay valve device 9 to the brake pipe 1 in case of rupture of the train brake pipe, and a fluid pressure operated valve device 21 for cutting off a communication between both the train control valve device 14 and the brake application valve device 13 and atmosphere to enable effecting a brake release subsequent to the occurrence of an automatic train control brake application.

The engineer's brake valve device 8 (FIG. 1A) comprises a self-lapping control valve device 22 for controlling the pressure in the equalizing reservoir 7 and a brake pipe vent valve 23 for effecting the release of fluid under pressure from the brake pipe 1 to atmosphere at an emergency rate upon manual movement of a handle 24 to an emergency position. Operation of the control valve device 22 and the brake pipe vent valve 23 is controlled by a cam 25 which is connected to a cam shaft 26 by a set screw 27. The cam shaft 26 is rotatably mounted in two coaxial spaced-apart bores 28 and 29 provided in a first casing section 30 which is secured by any suitable means (not shown) to a second casing section 31, it being understood that these two casing sections 30 and 31 form a sectionalized casing of the brake valve device 8.

Figure 1A:
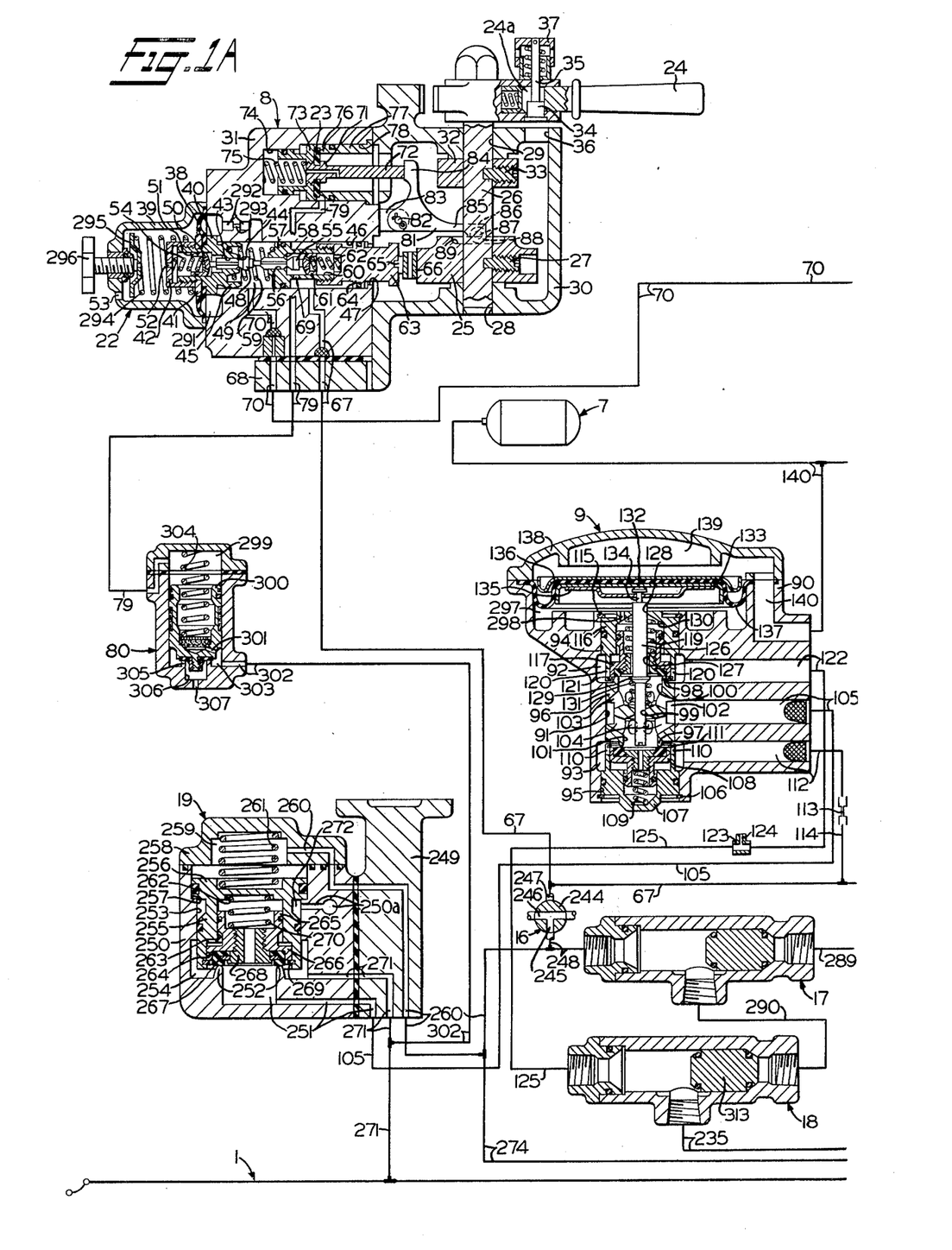
FIG. 1A and FIG. 1B, when taken together such that the right-hand edge of FIG. 1A is matched with the left-hand edge of FIG. 1B, constitute a diagrammatic view of a locomotive fluid pressure brake control apparatus embodying the invention.

A spacer 32 is secured to the cam shaft 26 by a set screw 33 it being apparent from FIG. 1A that this spacer 32 and the cam 25 prevent vertical movement of the cam shaft 26 relative to the casing section 30.

As shown in FIG. 1A, the cam shaft 26 extends through the bore 29 and is long enough to enable the handle 24 to be removably mounted thereon exterior of the casing section 30 when this handle is moved to a handle-off position in which it is shown. In this position, a collar 34 carried on the lower end of a stem 35 can be pushed downward into a bore 36 in the casing section 30 by a push button 37 secured to the upper end of the stem 35.

While in this lower position, a slot 24a in the handle 24, which slot is of such size as to enable the stem 35 to pass therethrough but prevent passage of the collar 34, enables the handle 24 to be withdrawn and thus removed from shaft 26 of the brake valve device 8.

The self-lapping control valve device 22 comprises a diaphragm 38 the outer periphery of which is clamped between the casing section 31 and a cover member 39 that is secured to this casing section 31 by any suitable means (not shown).

The inner periphery of the diaphragm 38 is clamped between a combined diaphragm follower and exhaust valve seat member 40 and an annular diaphragm follower plate 41 by an internally-threaded cup-shaped cap member 42 that has screw-threaded engagement with external screw threads provided therefor on the left-hand end of exhaust valve seat member 40.

The above-mentioned combined diaphragm follower and exhaust valve set member 40 is provided with a bore 43 having an annular exhaust valve seat 44 formed at its right-hand end. This combined diaphragm follower and exhaust valve seat member 40 is also provided at its right-hand end with a spherical skirt portion 45 that is slidably guided in a counterbore 46 which is coaxial with a bore 47 in the casing section 31.

Slidably mounted in the bore 43 is a fluted stem of an exhaust valve 48 that controls communication between a delivery chamber 49 and atmosphere via a pair of ports 50 in a spring seat 51, a port 52 in the cap member 42 and an exhaust port 53 in the cover member 39.

A spring 54 interposed between the cap member 42 and the spring seat 51 is normally effective, via this spring seat and the fluted stem of the exhaust valve 48, to unseat this exhaust valve 48 from its seat 44 and bias it against the end of a fluted stem of a supply valve 55.

The fluted stem of supply valve 55 is disposed in a bore 56 provided in a piston member 57 that has a supply valve seat 58 at the right-hand end of bore 56. This piston member 57 is slidably disposed in the counterbore 46 and is biased in the direction of the right hand by a spring 59 that is interposed between this piston member 57 and the combined diaphragm follower and exhaust valve seat member 40. Extending inward from the right-hand end of the piston member 57 is a counterbore 60 that is coaxial with the bore 56 and in which counterbore 60 is slidably disposed a ported cup-shaped spring seat 61 that is biased against the supply valve 55 by a spring 62 which is interposed between this spring seat 61 and a cam follower member 63 that has formed integral therewith and intermediate the ends thereof a piston 64 which is slidably and sealably mounted in the counterbore 46. The left-hand end of cam follower member 63 is cup-shaped and is provided with internal screw threads that have screw-threaded engagement with external screw threads provided therefor on the right-hand end of the piston member 57. The right-hand end of this cam follower member 63 is provided with a wear member 65 between which and the cam 25 is a cam roller 66 that is carried at the end of a pivoted lever (not shown).

Figure 1B:
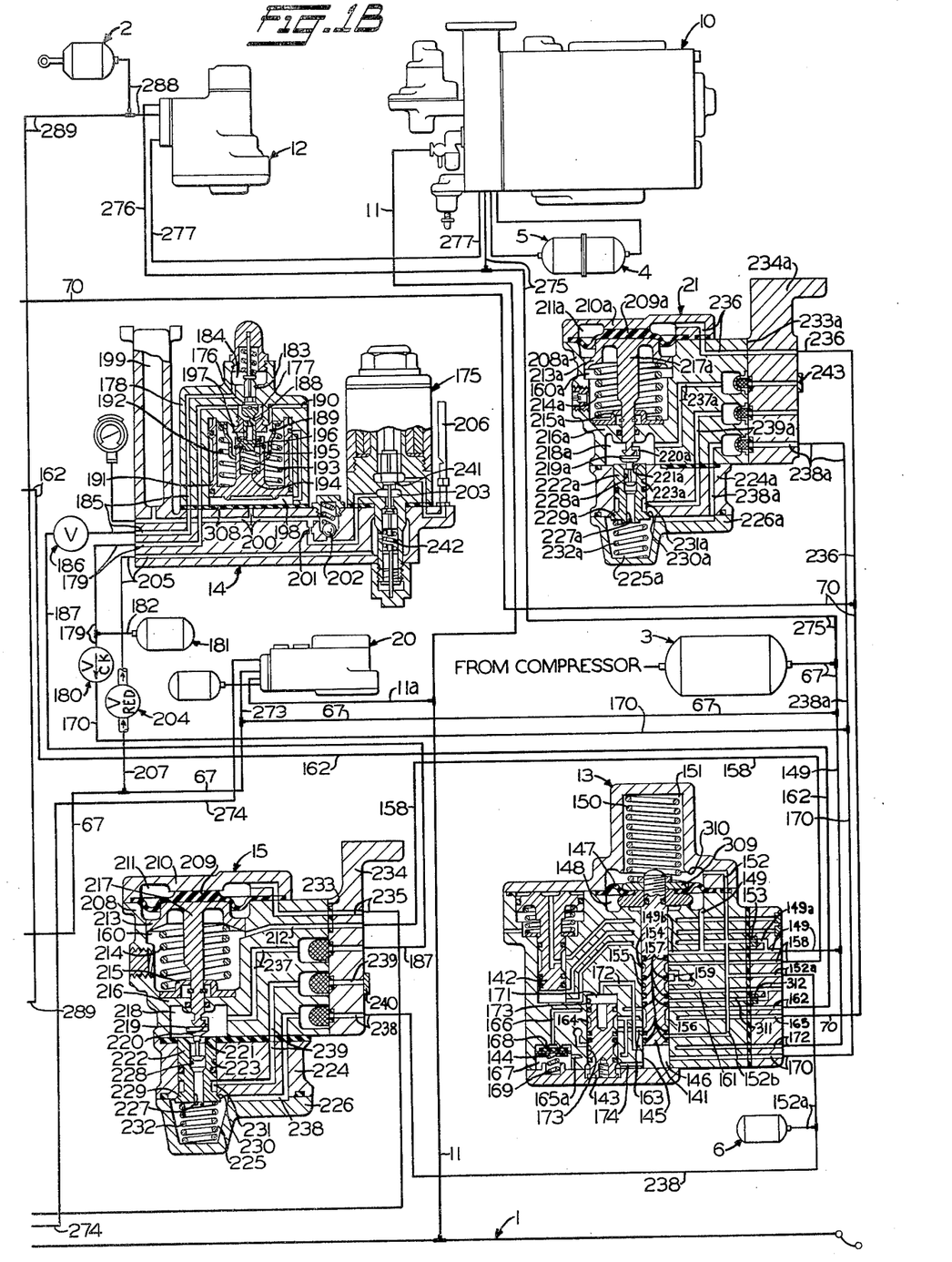

As shown in FIG. 1A, opening at the wall surface of the counterbore 46 at a location that is on the right-hand side of the piston member 57 is one end of a passageway 67 that extends through the casing section 31 and a pipe bracket 68 to which this casing section is secured by any suitable means (not shown) and is connected by a correspondingly numbered pipe to the main reservoir 3 (FIG. 1B).

The piston member 57 is provided with a port 69 that opens into the counterbore 60 in order that fluid under pressure may flow from the main reservoir 3 to the interior of this counterbore 60 via the pipe and passageway 67, counterbore 46, and this port 69 and thence past the supply valve 55 when unseated from its seat 58 to the delivery chamber 49.

Opening into the delivery chamber 49 is one end of a passageway 70 that extends through the casing section 31 and the pipe bracket 68 and is connected by a correspondingly numbered pipe to the brake application valve device 13 (FIG. 1B) in a manner hereinafter explained.

As shown in FIG. 1A, the hereinbefore-mentioned brake pipe vent valve 23 is clamped between a collar 71 formed on a valve stem 72 and a piston member 73 that has screw-threaded engagement with external screw threads provided therefor on the left-hand end of the stem 72.

Interposed between the piston member 73 and the end of a bottomed bore 74 in the casing section 31 is a spring 75 that is effective to normally bias the vent valve 23 against an annular valve seat 76 formed at the left-hand end of a bushing 77 which is carried in a counterbore 78 coaxial with the bottomed bore 74.

Opening at the wall surface of the counterbore 78 intermediate the ends thereof and adjacent the left-hand end of the bushing 77 therein is one end of a passageway 79 that extends through the casing section 31 and pipe bracket 68 and is connected by a correspondingly numbered pipe to an emergency brake application valve device 80 hereinafter described.

As shown in FIG. 1A, the brake pipe vent valve 23 may be unseated from its seat 76 against the yielding resistance of the spring 75 by a bell-crank level 81 that is rockably mounted on a pin 82 the opposite ends of which are carried in the jaws of a clevis 83 that is integral with the casing section 31.

The bell-crank lever 81 has two arms 84 and 85. The end of the arm 84 abuts the end of the valve stem 72. This valve stem 72 and the bell crank lever 81 are so arranged with respect to the cam shaft 26 that the arm 85 extends behind this shaft 26. The end of this arm 85 is provided with a clevis 86 in the jaws of which are anchored the opposite ends of a pin 87 which is rotatably mounted a roller 88. This roller 88 is adapted to roll on the surface of a semi-circular groove 89 provided therefor in the upper face of the cam 25 as this cam and the cam shaft 26 are rotated by the handle 24. The length of the groove 89 is such that, upon moving the handle 24 arcuately to its emergency position, the roller 88 rides up out of this groove 89 to thereby effect counterclockwise rocking of the bell-crank lever 81 about the pin 82. As the bell-crank lever 81 is thus rocked counterclockwise, its arm 84 is effective, via the valve stem 72, to unseat brake pipe vent valve 23 from its seat 76 whereupon fluid under pressure is vented from the passageway and pipe 79 to atmosphere via the bushing 77 and the bore 36 in the casing section 30.

As shown in FIG. 1A, the relay valve device 9 for controlling the supply of fluid under pressure to and the release of fluid under pressure from the brake pipe 1 comprises a casing 90 that is provided with a bore 91 which at its opposite ends opens respectively into chambers 92 and 93 formed within the casing 90. Extending from the chamber 92 to the upper end of the casing 90 is a bore 94, and extending from the chamber 93 to the lower end of this casing 90 is a bore 95. The bores 91, 94 and 95 and the chambers 92 and 93 enable mounting within the casing 90 a valve mechanism which will now be described.

Pressed into the bore 91 is a valve seat member 96 that has formed at its lower end a supply valve seat 97 and at its upper end an exhaust valve seat 98. The valve seat member 96 is provided with a bore 99 and a pair of coaxial counterbores 100 and 101 that extend inward from the respective opposite ends thereof. This valve seat member 96 is further provided with an elongated peripheral annular groove 102 that is connected with the counterbore 100 by a plurality of arcuately arranged drilled ports 103 and with the counterbore 101 by a plurality of arcuately arranged drilled ports 104. One end of the ports 103 and one end of the ports 104 open at the bottom of the groove 102 which is in alignment with one end of a delivery passageway 105 that extends through the casing 90 and has its opposite end connected by a correspondingly numbered pipe to the charging cut-off valve device 19 that is hereinafter described in detail.

Retained in the bore 95 by a snap ring 106 is a cup-shaped supply valve guide member 107 that has slidably disposed therein a piston-type supply valve 108 which is normally biased against the supply valve seat 97 by a spring 109 interposed between this supply valve 108 and the bottom of the cup-shaped guide member 107 that adjacent its upper end is provided with a pair of diametrically arranged ports 110. A snap ring 111 that is disposed in an annular groove adjacent the upper end of the cup-shaped supply valve guide member 107 enables this supply valve 108 and the valve guide member 107 to be withdrawn as a unit from the bore 95 when the snap ring 106 is removed.

Opening into the chamber 93 is one end of a passageway 112 that extends through the casing 90 and is connected by a correspondingly numbered pipe to one end of a fixed resistance or chock 113. Connected to the opposite end of this choke 113 is one end of a pipe 114 that has its opposite end connected to the pipe 67 intermediate the ends thereof, it being remembered that this pipe 67 is connected to the main reservoir 3.

The purpose of the choke 113 is to restrict the rate at which fluid under pressure can be supplied from the main reservoir 3 to the brake pipe 1 by the relay valve device 9.

If fluid under pressure were supplied to the brake pipe 1 at a more rapid rate than that provided by the choke 113, then were a break-in-two of the train to occur at a location remote from the locomotive, the rate of reduction of pressure in the train brake pipe extending from end to end of the locomotive and through the first several cars next to the locomotive would be less than an emergency rate of reduction of brake pipe pressure. Consequently, an emergency brake application would not be effected on the locomotive and these first several cars which of course would be most undesirable at this time.

Retained in the bore 94 by a snap ring 115 is a cup-shaped exhaust valve guide member 116 that has slidably and sealably disposed therein a piston-type exhaust valve 117 that is normally biased against the exhaust valve seat 98 by a spring 119 interposed between this exhaust valve 117 and cup-shaped guide member 116 that adjacent its lower end is provided with a pair of diametrically arranged ports 120. A snap ring 121 that is disposed in an annular groove adjacent the lower end of the exhaust valve guide member 116 enables the piston-type exhaust valve 117 and its guide member 116 to be withdrawn as a unit from the bore 94 when the snap ring 115 is removed.

Opening into the chamber 92 is one end of a passageway 122 that extends through the casing 90 and is connected by a correspondingly numbered pipe to one end of a pipe tee 123 that is provided with a choke or restricted opening 124 to atmosphere. The diameter of this restricted opening 124 may be, for example, 0.250 inch which will provide for the release of fluid under pressure from the brake pipe 1 at a service rate upon operation of the relay valve device 9, in a manner hereinafter described, to establish a communication between passageway and pipe 105 and passageway and pipe 122.

Connected to the other end of the pipe tee 123 is one end of a pipe 125 that has its other end connected to the left-hand inlet of the hereinbefore-mentioned double check valve device 18.

The supply valve 108 and the exhaust valve 117 of the relay valve device 9 are unseated from their respective valve seats 97 and 98 by a valve operating stem 126 that extends through the bore 99 in the valve seat member 96, a coaxial bore 127 in the exhaust valve 117, and a coaxial bore 128 in the exhaust valve guide member 116.

As is apparent from FIG. 1A of the drawings, that portion of the valve operating stem 126 that extends through the counterbore 100 is provided with a collar 129 which is formed integral therewith. The spring 119 is interposed between the exhaust valve 117 and an inclined surface 130 formed on exhaust valve guide member 116, and a spring 131 disposed in the counterbore 100 in surrounding relation to the valve operating stem 126 is interposed between the collar 129 and the valve seat member 96. The spring 131 serves to bias a button 132 at the upper end of the valve operating stem 126 against a diaphragm follower 133 and the spring 119 normally biases the exhaust valve 117 against its seat 98.

As shown in FIG. 1A, the button 132 is formed at the upper end of a portion 134 of the valve operating stem 126. This portion 134 has a smaller diameter than the remainder of the stem 126 and extends through a slot in a U-shaped member 135. Though not apparent in FIG. 1A, the width of this slot in the U-shaped member 135 at one end thereof is substantially equal to the diameter of the button 132 and at the other end is substantially equal to the diameter of the portion 134 of the stem 126. This construction enables the button 132 to be inserted through the wider end of the slot after which the portion 134 of the stem 126 is moved into the narrow end of this slot to thereby provide an operating connection between the valve operating stem 126 and the U-shaped member 135 that is secured to the lower side of the diaphragm follower 133 by any suitable means (not shown).

Disposed between the upper side of the diaphragm follower 133 and the lower side of a diaphragm follower plate 136 is a diaphragm 137. This diaphragm follower plate 136 may be secured to the diaphragm follower 133 and the U-shaped member 135 by such as a plurality of arcuately spaced-apart bolts (not shown) that extend through coaxial bores provided therefor in this diaphragm follower plate 136, the diaphragm 137, the diaphragm follower 133 and the U-shaped member 135, and a plurality of nuts (not shown).

The outer periphery of the diagram 137 is clamped between the upper end of the casing 90 and a cover member 138 that is secured to this casing 90 by any suitable means (not shown). This cover member 138 cooperates with the diaphragm 137 to form on the upper side of this diaphragm a chamber 139 into which opens one end of a passageway 140 that extends through the cover member 138 and the casing 90 and is connected by a correspondingly numbered pipe to the hereinbefore-mentioned equalizing reservoir 7 to enable the relay valve device 9 to be operated in accordance with variations of pressure in this equalizing reservoir 7 in a manner hereinafter explained.

The construction and operation of the brake control valve device 10 may be the same as that of the brake control valve device shown and described in U.S. Pat. No. 3,018,138, issued Jan. 23, 1962 to Richard L. Wilson et al. and assigned to the assignee of the present invention, and since this control valve device forms no part of the present invention, a further description is believed to be unnecessary.

The construction and operation of the relay valve device 12, which effects the supply of fluid under pressure to and the release of fluid under pressure from the brake cylinder 2, may be the same as that of the relay valve device 6 shown and described in U.S. Pat. No. 2,998,284, issued Aug. 29, 1961 to Walter B. Kirk and assigned to the assignee of the present invention, and since this relay valve device forms no part of the present invention, a further description is believed to be unnecessary.

The brake application valve device 13 (FIG. 1B) comprises a sectionalized casing containing an application valve 141, a suppression valve 142 which performs no function in connection with the present invention, a release control valve 143 and a check valve 144.

The application valve 141 is of the spool type and is reciprocable in a bore 145 formed in the sectionalized casing of the valve device 13. A chamber 146 is formed at the lower end of application valve 141 by its cooperative relationship with the wall of bore 145. The opposite end of the application valve 141 is connected to a diaphragm 147 which is subject on its lower side to fluid under pressure in a chamber 148 that is constantly open to the main reservoir 3 via a passageway and correspondingly numbered pipe 149 that is connected to the pipe 67 intermediate the ends thereof, it being remembered that pipe 67 is connected to the main reservoir 3. The diaphragm 147 is subject on its upper side to the force of a heavy spring 150 and fluid under pressure in a chamber 151 that is constantly open via a passageway 152, a chock 153 and a branch passageway 149a to the passageway 149 that is connected to the main reservoir 3, as explained above.

Intermediate its ends, the application valve 141 is provided with three spaced-apart peripheral annular grooves 154, 155 and 156 which are sealingly separated one from the other by O-ring seals 157, there being two of these O-ring seals adjacent each end of the peripheral annular groove 156. The spring 150 is of such strength as to maintain application valve 141 in the normal position in which it is shown in FIG. 1B so long as pressure in the chamber 148 does not exceed the pressure in the chamber 151 by more than a preselected degree, such as, for example, 35 pounds per square inch.

While the valve 141 occupies the position shown in FIG. 1B, the groove 154 thereon connects a passageway and correspondingly numbered pipe 158 to an atmospheric vent passageway 159. The pipe 158 is connected to a spring chamber 160 in the suppression valve device 15 in a manner hereinafter explained. Therefore, while the application valve 141 occupies the position shown, fluid under pressure is vented from the chamber 160 in this suppression valve device 15.

Also, while the application valve 141 occupies the position shown, the groove 155 thereon connects one end of a passageway 161 in the sectionalized casing of the brake application valve device 13 to the vent passageway 159. The other end of the passageway 161 is open to atmosphere as it forms no part of the present invention.

The groove 156 on valve 141 connects one end of a passageway and correspondingly numbered pipe 162 that has its opposite end connected to the pipe 140 intermediate the ends thereof, to one end of a passageway 163 the opposite end of which is connected to a peripheral annular groove 164 formed on the release control valve 143, which also is of the spool type, to one end of a passageway 165 that extends through the sectionalized casing of the brake application valve device 13 to the exterior thereof and has one end of the hereinbefore-mentioned pipe 70 connected thereto, the other end of this pipe 70 being connected to the passageway 70 in the brake valve device 8. As shown in FIG. 1A of the drawings, this passageway 70 leads to the delivery chamber 49 in the self-lapping control valve device 22 of the brake valve device 8.

The groove 156 (FIG. 1B) on the application valve 141 also connects, while this valve 141 is in the position shown in FIG. 1B, the passageway 162 to a passageway 166 which leads to the inner seated area of the hereinbefore-mentioned check valve 144 that is disposed in a chamber 167 and biased against an annular valve seat 168 by a spring 169. The chamber 167 has opening thereinto one end of a branch passageway 165a, the opposite end of which is connected to the passageway 165.

The hereinbefore-mentioned passageway 149 in the sectionalized casing of the valve device 13 has a branch passageway 149b that opens at the wall surface of the bore 145. This end of the branch passageway 149b is closed by the valve 141 while it is in the position shown in FIG. 1B.

The passageway 152 in the sectionalized casing of the brake application valve device 13 has a first branch passageway 152a that is connected by a pipe bearing the same numeral to the hereinbefore-mentioned timing reservoir 6. A second branch passageway 152b opens at one end into the branch passageway 152a and at the other at the wall surface of the bore 145 at a location spaced above the location at which one end of a passageway and a correspondingly numbered pipe 170 opens at the wall surface of this bore 145. The pipe 170 is connected to the train control valve device 14 and the fluid pressure operated valve device 21 in a manner hereinafter described.

Opening into a chamber 171 above the hereinbefore-mentioned release control valve 143 is one end of a passageway 172 that extends through the sectionalized casing of the brake application valve device 13 and is connected by a correspondingly numbered pipe to the hereinbefore-mentioned pipe 149 intermediate the ends thereof. This pipe 149 is connected to the pipe 67 which is connected to the main reservoir 3. Therefore, fluid under pressure normally flows from the main reservoir 3 to the chamber 171 above the release control valve 143 via pipes 67 and 149, the pipe and passageway 172 to maintain this release control valve 143 in its lower position in which it is shown in FIG. 1B.

The hereinbefore-mentioned passageway 165 in the sectionalized casing of valve device 13 opens at the wall surface of a bottomedbore 173 in this casing. The release control valve 143 is slidably mounted in this bottomedbore 173 that, adjacent its lower end, is connected by a passageway 174 to the lower end of the bore 145 which is normally vented to atmosphere via passageway and pipe 170 and the fluid pressure operated valve device 21 in a manner hereinafter made apparent.

The train control or timing valve device 14 may be such as that shown and described in U.S. Pat. No. 2,322,042, issued June 15, 1943 to Glenn T. McClure, and assigned to the assignee of the present application, and in view of this it is deemed unnecessary to describe this device in detail. It will, of course, be understood from the above-mentioned patent that the timing valve device 14 comprises a magnet valve device 175 operating on a circuit adapted to be controlled by any suitable means (not shown) which are operative in response to favorable or more restricted track signals and thereby the existing track conditions on a railroad. When the track signal is favorable, the magnet valve device 175 is adapted to be energized. Conversely, when the track signal is more restricted, the magnet valve device is deenergized.

The timing valve device 14 further comprises a double beat valve 176 contained in a chamber 177 formed in a sectionalized casing section 178 which chamber 177 is connected by a passageway and correspondingly numbered pipe 179 to the inlet of a check valve device 180 and a stop reservoir 181 which is connected to the pipe 179 intermediate the ends thereof by a pipe 182. The hereinbefore-mentioned pipe 170 is connected to the inlet of the check valve device 180.

The double beat valve 176 is provided with a fluted stem 183 which extends into a chamber 184 also formed in the sectionalized casing 178. Opening into this chamber 184 is one end of a passageway 185 that extends through the sectionalized casing 178 and is connected by a correspondingly numbered pipe to the outlet of a manually operated cut-off valve 186. Connected to the inlet of cut-off valve 186 is one end of a pipe 187 the other end of which is connected to the suppression valve device 15 in a manner hereinafter described.

The above-mentioned double beat valve 176 also has a hollow stem 188 extending in the opposite direction into a chamber 189 in the casing section 178 which chamber 189 is open to the atmosphere through a vent passageway 190.

The chamber 189 is provided at one side of a valve piston 191 which is subject to the biasing force of a spring 192 and which is operatively connected through a resilient connection to the stem 188. This resilient connection comprises a spring 193 disposed within a bottomedbore 194 formed in a stem 195 that is integral with the valve piston 191 and interposed between the bottom of the bottomedbore 194 and a collar 196, which is formed on the lower end of the stem 188 and slidably mounted in the upper end of the bottomedbore 194. A snap ring 197 is inserted in a groove formed in the wall of bottomedbore 194 and in surrounding relation to the stem 188 on the upper side of the collar 196 to complete the resilient connection between the stem 188 and the valve piston 191.

At the opposite or lower side of the valve piston 191 is a chamber 198 in constant communication with a timing reservoir 199 through a passageway 200 which is also connected through a choke 201 and a ball type check valve 202 arranged in parallel therewith to a chamber 203 in the magnet valve device 175, the check valve being arranged to provide for flow of fluid under pressure in the direction from the chamber 230 to the timing reservoir 199 but to prevent flow therepast in the opposite direction.

It should be further understood, as explained in detail in the hereinbefore-mentioned U.S. Pat. No. 2,322,042, that the magnet valve device 175 is operative to effect the supply of fluid under pressure at a constant reduced pressure from the outlet of a pressure reducing valve device 204, which is connected to the magnet valve device 175 by a pipe and correspondingly numbered passageway 205 to the chamber 198 and the timing reservoir 199, and the release of fluid under pressure from this chamber and reservoir to atmosphere through a fluid under pressure operated whistle 206 adapted to produce a sound upon the flow of fluid under pressure therethrough.

An inlet of the pressure reducing valve device 204 is connected by a pipe 207 to the pipe 67 which is connected to main reservoir 3 that may be charged with fluid under pressure by the usual fluid compressors (not shown) forming a part of the fluid pressure locomotive brake equipment.

The suppression valve device 15 and the fluid pressure operated valve device 21 are substantailly identical in construction. Therefore, a description of one will suffice for both, it being noted that the corresponding parts of the fluid pressure operated valve device 21 are denoted by the same numeral with the addition of the letter *a*.

The suppression valve device 15 comprises a casing section 208 containing a diaphragm 209 clamped about its periphery between the casing section 208, and a cover 210, and defining with the cover a control chamber 211. At the other side of the diaphragm 209 is the hereinbefore-mentioned spring chamber 160 into which opens one end of a passageway 212 to the opposite end of which is connected the hereinbefore-mentioned pipe 158. Contained in the chamber 160 is a diaphragm follower 213 which is biased into operative contact with the diaphragm 209 by a spring 214 interposed between the follower 213 and a hollow spring seat 215 that rests against a partition wall 216 of the chamber 160. Follower 213 has a stem 217 that extends through the hollow spring seat 215 and a central opening in the partition wall 216.

A chamber 218 is formed in the casing section 208 at the side of the partition wall 216 opposite the chamber 160 and contains a valve 219 that is linked by means of a forked connection 220 to the lower end of follower stem 217, as viewed in FIG. 1B of the drawings. The valve 219 is adapted to make seating contact with a valve seat 221 formed on the upper end of a cylindrical valve member 222, which is slidably mounted in a bore 223 formed in a casing section 224 which is secured to the casing section 208 by any suitable means (not shown). The bore 223 in the casing section 224 extends from the chamber 218 to a chamber 225 formed in another casing section 226 secured to the casing section 224 by any suitable means (not shown).

The valve member 222 is provided with a through bore 227 and a coaxial counterbore 228 encircled at its upper end by the valve seat 221. The lower end of the cylindrical valve member 222 is encircled by a conical or poppet-type valve 229, which valve is arranged for cooperation with a valve seat 230 formed on the casing section 224 at the lower end of bore 223 to control communication between chamber 225 and a chamber 231 defined by the wall of the bore 223 and a reduced portion of the valve member 222. A spring 232 is disposed in chamber 225 and is interposed between the valve 229 and the casing section 226 for urging the valve member 222 upwardly to a position in which communication between chambers 218 and 225 is open via bore 227 and counterbore 228, and communication between chamber 225 and chamber 231 is closed, as shown in FIG. 1B of the drawings.

The casing section 208 is provided with a vertical bolting face 233 whereby the suppression valve device 15 can be secured to a pipe bracket 234 by any suitable means such as cap screws (not shown). The pipe bracket 234 may be secured to any suitable part of a locomotive.

In order that fluid under pressure may be supplied in a manner hereinafter made apparent to the chamber 211 in the suppression valve device 15 for effecting operation of this valve device, the chamber 211 is connectd by a passageway and correspondingly numbered pipe 235 to the outlet of the hereinbefore-mentioned double check valve device 18 shown in FIG. 1A of the drawings.

In order that fluid under pressure may be supplied to the chamber 211a (FIG. 1B) in the fluid pressure operated valve device 21 for effecting operation of this valve device, a passageway 236 extending through the cover 210a, casing section 208a and pipe bracket 234a has one end opening into this chamber 211a and the other end connected by a correspondingly numbered pipe to the hereinbefore-mentioned pipe 70 intermediate the ends thereof, it being remembered that this pipe 70 is supplied with fluid under pressure from the delivery chamber 49 (FIG. 1A) in the self-lapping control valve device 22 of the engineer's brake valve device 8.

In order that operation of the suppression valve device 15 prevent operation of the brake application valve device 13 to effect an automatic train control brake application on the train in a manner hereinafter described, upon deenergization of the magnet valve device 175 of the train control valve device 14 in response to the train entering a block where there is a more restricted track signal indication, this suppression valve device 15 is connected to the brake application valve device 13 and the control valve device 14 in a manner now to be described.

Opening into the chamber 218 in the suppression valve device 15 is one end of a passageway 237 that extends through the casing section 208 and pipe bracket 234 and has the other end of the hereinbefore-mentioned pipe 187 connected thereto.

Likewide, opening into the chamber 255 in the suppression valve device 15 is one end of a passageway 238 that extends through the casing sections 226, 224 and 208 and the pipe bracket 234 and is connected by a correspondingly numbered pipe to the hereinbefore-mentioned branch passageway 152a intermediate the ends thereof.

Moreover, opening into the chamber 231 in the suppression valve device 15 is one end of a passageway 239 that extends through the casing sections 224 and 208 and the pipe bracket 234 to the exterior thereof. A blanking pad 240 is secured to the pipe bracket 234 to prevent the flow of fluid under pressure from this passageway 239 to atmosphere.

From the foregoing, it is apparent that upon the supply of fluid under pressure to the chamber 211 in the suppression valve device 15 in a manner hereinafter described, the diaphragm 209 is deflected downward to, via the stem 217, first effect seating of the valve 219 on its seat 221 and thereafter unseating of the valve 229 from its seat 230.

It is apparent that, with valve 219 seated on its seat 221, fluid under pressure cannot flow from the chamber 151 in the brake application valve device 13 to the train control valve device 14 via passageway 152, branch passageway and pipe 152a, pipe and passageway 238, chamber 225, bore 227, counterbore 228, chamber 218, passageway 237, pipe 187, cut-off valve 186 which it may assume occupies its open position, and pipe and passageway 185. Therefore, deenergization of the magnet valve device 175 in response to the train entering a block where there is a more restricted track signal indication and the resulting unseating of a valve 241 by a spring 242 to effect venting of fluid under pressure from the chamber 198 to atmosphere via the passageway 200, choke 201, chamber 203 and the whistle 206 in order that spring 192 may move valve piston 191 and double beat valve 176 downward to connect pipe and passageway 185 to the stop reservoir 181 via passageway and pipe 179 and pipe 182 is ineffective to cause an automatic train control brake application.

As shown in FIG. 1B of the drawings, the end of the passageway 239a in the fluid pressure operated valve device 21 is open to atmosphere, the end of the passageway 237a is closed by blanking pad 243, and the end of the passageway 238a is connected by a correspondingly numbered pipe to the hereinbefore-mentioned pipe 170 intermediate the ends thereof. As hereinbefore-mentioned, the pipe and correspondingly numbered passageway 170 opens at the wall surface of the bore 145 in the brake application valve device 13. Consequently, so long as the self-lapping control valve device 22 of the engineer's brake valve device 8 is effective to supply fluid under pressure to the chamber 211a in the fluid pressure operated valve device 21 via passageway and pipe 70 and pipe and passageway 236, the valve 219a will be seated on its seat 221a and the valve 229a will be unseated from its seat 230a to open a communication between the chamber 146 in the brake application valve device 13 and atmosphere via passageway and pipe 170, pipe and passageway 238a, chamber 225a, past unseated valve 229a, chamber 231a and passageway 239a.

The manually operated three-way cut-out valve device 16 shown in FIG. 1A comprises a rotatable plug 244 having therein two intersecting passageways 245 and 246 whereby, while this plug 244 occupies the position shown in FIG. 1A, communication is closed between a pipe 247 that is connected to the pipe 67 intermediate the ends thereof and a pipe 248 which is connected to the left-hand inlet of the hereinbefore-mentioned check valve device 17 and this pipe 248 is open to atmosphere.

The brake pipe charging cut-off valve device 19 comprises a pipe bracket 249 and a casing 250 secured to the left-hand side of this pipe bracket by any suitable means (not shown). The hereinbefore-mentioned opposite end of the pipe 105 is connected to one end of a passageway 251 that extends through the pipe bracket 249 and casing 250 and at its other end is surrounded by an annular valve seat 252.

The casing 250 is provided with a bore 253 that at its lower end opens into a chamber 254 formed in the casing. Slidably and sealably mounted in the bore 253 is a valve guide member 255 that has formed integral therewith a piston 256 which is slidably and sealably mounted in a counterbore 257 that is coaxial with the bore 253. The upper end of the counterbore 257 is closed by a cover member 258 that is secured to the casing 250 by any suitable means (not shown).

The cover member 258 cooperates with the counterbore 257 and piston 256 to form on the upper side of this piston a chamber 259 into which opens one end of a passageway 260 that extends through the cover member 258, casing 250 and pipe bracket 249 and is connected by a correspondingly numbered pipe to the hereinbefore-mentioned pipe 248 intermediate the ends thereof.

A spring 261 disposed in the chamber 259 and interposed between the cover member 258 and the upper side of the piston 256 is normally effective to bias this piston against the lower end of the counterbore 257.

The valve guide member 255 is provided with a bottomed bore 262 and two coaxial counterbores 263 and 264 of unequal diameter. Slidably and sealably mounted in the counterbore 263 is a valve piston 265 that has formed integral therewith at the lower side thereof a skirt member 266 that is slidably mounted in counterbore 264. A disc valve 267 covered with some resilient material such as, for example, rubber, is secured to the skirt member 266 by a hollow screw-threaded plug member 268. A snap ring 269 that is inserted in a groove formed in the wall surface of the counterbore 264 enables the valve guide member 255, the pistons 256 and 265, skirt member 266 and disc valve 267 to be removed as a unit from the casing 250 upon removal of the cover member 258 from the upper end of this casing.

A spring 270 that is disposed in the counterbore 263 and interposed between the upper end of the bottomed bore 262 and the valve piston 265 normally biases the disc valve 267 against the valve seat 252 to close communication between the passageway 251 and the chamber 254 into which opens one end of a passageway 271 that extends through the casing 250 and the pipe bracket 249 and is connected by a correspondingly numbered pipe to the brake pipe 1.

As shown in FIG. 1A, the valve guide member 255 is provided with a peripheral annular groove 272 that is in alignment with an atmospheric passageway 250a provided in the casing 250. The length of this groove 272 is such that it is in communication with the passageway 250a in all positions of the piston 256 and the valve guide 255 that is integral therewith. Therefore, any fluid under pressure that leaks from the chamber 254 or the chamber 259 into the groove 272 will be vented to atmosphere.

The construction and operation of the charging cut-off pilot valve device 20 may be the same as that of the charging cut-off pilot valve device 8 shown in FIG. 3 of U.S. Pat. No. 3,749,453 issued July 31, 1973 to Richard L. Wilson et al. and assigned to the assignee of the present application. Therefore, a further description of this charging cut-off pilot valve device 20 is believed to be unnecessary. Briefly, however, this charging pilot cut-off valve device 20 is connected to the branch pipe 11 by a pipe 11a and is operative in response to an emergency rate of reduction of pressure in the brake pipe 1 to effect the supply of fluid under pressure from the main reservoir 3, which is connected to this valve device 20 by the pipe 67 and a pipe 273, to a pipe 274 which is connected to the hereinabove-mentioned pipe 260 intermediate the ends thereof. It being remembered that the pipe and passageway 260 opens into the chamber 259 above the piston 256 of the charging cut-off valve device 19, it is apparent that upon the supply of fluid under pressure to this chamber 259 in response to operation of the charging cut-off pilot valve device 20, this piston 256 is forced against the lower end of the counterbore 257 so that the spring 270 biases the piston 265 and skirt member 266 downward thereby maintaining disc valve 267 seated on valve seat 252.

With valve 267 seated on its seat 252, communication between the relay valve device 9 and the brake pipe 1 is closed thereby rendering the relay valve device 9 ineffective to supply fluid under pressure to the brake pipe 1. Therefore, an emergency brake application will be effected on the locomotive and all the cars in the train in response to the reduction of pressure in the train brake pipe at an emergency rate upon the occurrence of a rupture in the train brake pipe.

In order to provide for a supply of fluid under pressure for operation of the brake control valve device 10 (FIG. 1B) one end of a pipe 275 is connected to a supply passageway (not shown) in this valve device 10 and the opposite end is connected to the pipe 67 which is connected to the main reservoir 3.

Likewise, in order to provide for a supply of fluid under pressure to the relay valve device 12, one end of a pipe 276 is connected to a supply passageway (not shown) in this valve device 12 and the opposite end is connected to the pipe 275 intermediate the ends thereof.

Moreover, in order that the brake control valve device 10 controls the operation of the relay valve device 12, a delivery passageway (not shown) in the valve device 10 is connected to a control passageway (not shown) in the valve device 12 by a pipe 277.

Furthermore, a delivery passageway (not shown) in the relay valve device 12 is connected by a pipe 288 to the brake cylinder 2.

According to the present invention, one end of a pipe 289 is connected to the pipe 288 intermediate the ends thereof, and the opposite end of this pipe 289 is connected to the right-hand inlet of the hereinbefore-mentioned double check valve device 17 (FIG. 1), the outlet of which is connected to the right-hand inlet of the double check valve device 18 by a pipe 20. The outlet of this double check valve device 18 is connected to the chamber 211 (FIG. 1B) in the suppression valve device 15 by the pipe and passageway 235, as hereinbefore stated.

The hereinbefore-mentioned emergency brake application valve device 80 may be the same in construction and operation as the brake application valve device shown in Parts Catalog G-h-3230-4 published in January, 1971 by Westinghouse Air Brake Company, a subsidiary of American Standard, Inc. of New York, New York.

OPERATION

Assume initially that the apparatus is void of fluid under pressure; that magnet valve device 175 (FIG. 1B) is energized in response to a clear or proceed track signal for establishing a communication between passageway and pipe 205, which is connected to the outlet of reducing valve device 204, and passageway 200 via chamber 203, choke 201 and ball check valve 202 through which fluid under pressure may be supplied to the timing reservoir 199 and chamber 198 to move valve piston 191 and double beat valve 176 to an upper position in which this valve 176 closes communication between passageway and pipe 185 that is connected to cut-off valve 186 which it may be assumed is open, and chamber 177 to which passageway and pipe 179 is connected; that the handle 24 (FIG. 1A) of the engineer's brake valve device 8 is in its release position; and that the plug 244 of the cut-off valve device 16 occupies the position shown thereby closing communication between pipe 247 and pipe 248. Under these conditions, the various components of the apparatus will be in the respective positions in which they are shown in FIGS. 1A and 1B.

INITIAL CHARGING

To initially charge the apparatus, diesel engines are started for operating fluid compressors (not shown) to effect charging of the main reservoir 3 (FIG. 1B). With the brake application valve device 13 in the position shown, and the pipe and passageway 185 cut off from the stop reservoir 181 by the double beat valve 176 of the train control valve device 14, the brake apparatus will be charged in the following manner.

Fluid under pressure will be supplied from the main reservoir 3 to the chamber 148 at the lower side of the diaphragm 147 of the brake application valve device 13 via pipe 67, and pipe and passageway 149 at a substantially unrestricted rate, and will also be supplied to the chamber 151 at the upper side of the diaphragm 147 at a restricted rate via branch passageway 149a, choke 153 and passageway 152. However, choke 153 is of such flow capacity that despite the more rapid rate of charging of the chamber 148, application valve 141 will remain in its normal position, in which it is shown, during initial charging because the pressure in chamber 148 will not exceed the pressure in chamber 151 by an amount sufficient to overcome the heavy bias of spring 150 and because the lower end of the bore 145 will be vented to atmosphere via passageway and pipe 170, pipe and passageway 238a, chamber 225a in fluid pressure operated valve device 21, thence past valve 229a which is unseated from its valve seat 230a in a manner hereinafter explained, chamber 231a, and passageway 239a.

Some of the fluid under pressure supplied to the passageway 152 will flow therefrom to the timing reservoir 6 and the passageway 185 in the train control valve device 14 via branch passageway and pipe 152a, pipe and passageway 238 in suppression valve device 15, chamber 225, bore 227, counterbore 228, past unseated valve 219, chamber 218, passageway 237, pipe 187 and open cut off valve 186. Since double beat valve 176 is now seated in its upper position, as hereinbefore explained, fluid under pressure cannot flow from pipe and passageway 185 to the stop reservoir 181. Consequently, the timing reservoir 6 will be charged to the pressure in the main reservoir 3.

Fluid under pressure will also flow from the main reservoir 3 to the chamber 171 above the release control valve 143 via pipes 67 and 149, and pipe and passageway 172. The lower end of the bottomedbore 173, in which the valve 143 is slidably mounted, is connected by the passageway 174 to the lower end of the bore 145 which is open to atmosphere via the valve device 21 in the manner explained above. Consequently, the fluid under pressure supplied to the chamber 171 will thus positively bias the release control valve 143 to its normal lower position in which it is shown in FIG. 1B of the drawings.

Whenever the handle 24 (FIG. 1A) of the engineer's brake valve device 8 is moved to its release position, the cam 25 is effective to unseat the supply valve seat 58 from the supply valve 55. Therefore, fluid under pressure will flow from the main reservoir 3 to the delivery chamber 49 via pipe and passageway 67, counterbore 46, port 69, past unseated valve 55 and bore 56, and thence to the equalizing reservoir 7 via passageway and pipe 70, passageway 165 (FIG. 1B) in brake application valve device 13, groove 164 on release control valve 143, passageway 163, groove 156 on application valve 141, passageway and pipe 162 and pipe 140 (FIG. 1A).

Fluid under pressure will also flow from the delivery chamber 49 to a chamber 291 at the right-hand side of the diaphragm 38 via a passageway 292 having a choke 293 therein. Consequently, the chamber 291 and the equalizing reservoir 7 will be charged to a preselected normal charged value which is determined by the strength of a spring 294 that is interposed between the follower plate 41 and a spring seat 295 that rests against an adjusting screw 296 by which the strength of the spring 294 may be varied to provide any desired preselected pressure in the equalizing reservoir 7 and chamber 291.

Fluid under pressure supplied to the pipe 140 and equalizing pressure 7 in the manner described above will flow therefrom to the chamber 139 in the relay valve device 9. Fluid under pressure thus supplied to the chamber 139 will deflect the diaphragm 137 of this valve device 9 downward to, via the valve operating stem 126, effect unseating of the supply valve 108 from its seat 97.

Upon unseating of valve 108 from its seat 97, fluid under pressure will flow from the chamber 93, which is connected to the main reservoir 3 via passageway and pipe 112, choke 113, pipe 114 and pipe 67, past the unseated valve 108 and through counterbore 101, ports 104, groove 102, passageway and pipe 105, and passageway 251 to the lower side of the valve 267 of the charging cut-off valve device 19. As soon as the pressure beneath the valve 267 is built up sufficiently to overcome the force of the spring 270, the valve 267 will be unseated from its seat 252 whereupon fluid under pressure will flow from the passageway 251 to the brake pipe 1 via the chamber 254 and passageway and pipe 271.

As can be seen from FIG. 1A, some of the fluid under pressure supplied to the passageway 105 will flow therefrom to a chamber 297 below the diaphragm 137 via groove 102, ports 103, counterbore 100, bore 127 and a port 298 in the exhaust valve guide member 116. Consequently, the pressure in the brake pipe 1 and the chamber 297 will increase until this pressure is substantially the same as that in the equalizing reservoir 7 and the chamber 139 whereupon the spring 109 will seat supply valve 108 on its seat 97 to prevent further flow of fluid under pressure to the brake pipe 1. Thus, the brake pipe 1 is charged by the relay valve device 9 to substantially the same pressure as is present in the equalizing reservoir 7 and chamber 139.

The brake control valve device 10 on the locomotive will respond to the charging of the brake pipe 1 by the relay valve device 9 to connect the pipe 277 to atmosphere whereupon the relay valve device 12 will operate to connect pipes 288 and 289 and the brake cylinder 2 to atmosphere thereby releasing the brakes on the locomotive.

The brake control valves on the cars in the train will likewise operate in response to charging the train brake pipe to effect a release of the brakes on these cars.

It will be noted that some of the fluid under pressure supplied to the pipe 70 by the self-lapping control valve device 22 of the brake valve device 8 in the manner hereinbefore described will flow to the chamber 211a in the fluid pressure operated valve device 21 to deflect diaphragm 209a downward and thereby effect seating of valve 219a on its seat 221a and unseating of valve 229a from its seat 230a.

When valve 229a is thus unseated from its seat 230a, the pipe and passageway 238a and bore 145 are opened to atmosphere via chamber 225a, past unseated valve 229a, chamber 231a and passageway 239a.

MANUALLY EFFECTED BRAKE APPLICATION

To manually effect a service brake application on the locomotive and cars in the train hauled thereby, the engineer will move the brake valve handle 24 (FIG. 1A) arcuately from its release position into an application zone to a position corresponding to the degree of service application desired. As the handle 24 is moved into the application zone, the cam 25 is rotated via the shaft 26 in the direction to enable the spring 59 to move supply valve seat 58 to supply valve 55 in the direction of the right hand to thereby render the spring 54 effective to unseat the exhaust valve 48 from its seat 44 whereupon fluid under pressure will be vented from the chamber 49, the equalizing reservoir 7, and chambers 139 and 291 that are connected to this chamber 49 via the pathways previously described, to atmosphere via bore 43, and ports 50, 52 and 53 until the pressure in the chamber 291 is reduced sufficiently for the spring 294 to move the exhaust valve seat 44 into seating contact with the exhaust valve 48.

As the pressure in the chamber 139 above the diagram 133 of the relay valve device 9 is reduced in the manner explained above, the pressure in the chamber 297 is rendered effective to deflect the diaphragm 137 upward and carry the stem 126 upward with it so that the collar 129 on this stem 126 lifts the exhaust valve 117 from its seat 98.

When valve 117 is thus unseated from its seat 98, fluid under pressure will flow from the brake pipe 1 to the passageway and pipe 122 via pipe and passageway 271, chamber 254, past unseated valve 267, passageway 251, pipe and passageway 105, groove 102, ports 103, counterbore 100, past unseated valve 117, ports 120 and chamber 92.

It will be noted from FIG. 1A that the pipe 122 is connected to the pipe tee 123 that is provided with the choke 124 the size of which, as hereinbefore stated, may be 0.250 inch. Therefore, fluid under pressure flows from the brake pipe 1 to the pipe 122 and thence to atmosphere via the choke 124 at a service rate, the aforesaid size of 0.250 inch of this choke 124 being that required to provide for a service rate of brake pipe reduction.

Since the choke 124 restricts the flow of fluid under pressure from the pipe 122 to atmosphere, some of the fluid under pressure supplied to the pipe 122 flows to the chamber 211 in the suppression valve device 15 via pipe 125, double check valve device 18, and pipe and passageway 235. Fluid under pressure thus supplied to the chamber 211 deflects diaphragm 209 downward to effect seating of valve 219 on seat 221 and unseating of valve 229 from its seat 230. This operation of the suppression valve 15 is without significance at this time.

It will be noted from FIG. 1A that fluid under pressure will flow from the chamber 297 below the diaphragm 137 of relay valve device 9 to atmosphere via port 298 in exhaust guide member 116, bore 127, ports 120, chamber 92, passageway and pipe 122, pipe tee 123 and choke 124. Therefore, when the pressure in the chamber 297 has been reduced to substantially that in the chamber 139, the spring 119 will move the valve operating stem 126 and exhaust valve 117 downward until this exhaust valve 117 is seated on its seat 98 thereby cutting off flow of fluid under pressure from the brake pipe 1 and the chamber 297 to atmosphere via the choke 124.

The brake control valve device 10 and relay valve device 11 on the locomotive and the control valve devices on the cars in the train will operate in response to the above-described release of fluid under pressure from the train brake pipe at a service rate to effect a service brake application on the locomotive and cars in the train to a degree corresponding to the degree of reduction of the pressure in the train brake pipe.

If the brake valve handle 24 (FIG. 1A) were moved into the application zone to its full service position, the same connections described above would be established whereupon a full service reduction in equalizing reservoir pressure, and hence a corresponding reduction of train brake pipe pressure, would be effected for causing a full service brake application on the entire train.

To manually effect an emergency application of brakes, the engineer will move the handle 24 of the brake valve device 8 to an emergency position.

As the handle 24 is thus moved to its emergency position, the shaft 26 and cam 25 are rotated far enough to cause the roller 88 to ride up out of the semi-circular groove 89 thereby effecting counter-clockwise rocking of the bell-crank lever 81 about pin 82.

As the bell-crank lever 81 is thus rocked counter-clockwise, its arm 84 is effective to shift valve stem 72 in the direction of the left hand to unseat brake pipe vent valve 23 from valve seat 76.

Upon unseating valve 23 from its seat 76, fluid under pressure will flow from a chamber 299 above a piston valve 300 in the emergency brake application valve device 80 to atmosphere via the pipe and passageway 79, past unseat valve 23, the interior of bushing 77 and the bore 36 in the casing section 30.

The piston valve 300 is provided with a small bore 301 the size of which is such as to restrict the rate of flow of fluid under pressure from the brake pipe 1 to the chamber 300 via the pipe 271 and a pipe 302 that at one end is connected to the pipe 271 and at the other end is connected by a correspondingly numbered passageway to a chamber 303 below the piston valve 300. Therefore, fluid under pressure will be vented from the chamber 299 faster than it can flow from the chamber 303 to this chamber 299 via the small bore 301 in the piston valve 300.

Accordingly, the pressure in the chamber 303 will quickly exceed that in the chamber 299 and shift the piston valve 300 upward against the yielding resistance of a spring 304 to unseat this piston valve 300 from an annular valve seat 305 that is formed at the upper end of a counterbore 306 that is coaxial with a bore 307 the size of which is such as to provide for the release of fluid under pressure from the train brake pipe at an emergency rate.

The brake control valve devices on the locomotive and cars in the train will operate in response to this release of fluid under pressure from the train brake pipe at an emergency rate to effect an emergency brake application on the entire train.

AUTOMATICALLY EFFECTED BRAKE APPLICATION UPON A CHANGE IN A TRAIN CONTROL TRACK SIGNAL INDICATION TO A MORE RESTRICTED INDICATION

Assume that, while the apparatus is fully charged, the brake valve handle 24 (FIG. 1) is in its release position and the train is running along a track, the train enters a block where there is a more restricted track signal indication. This more restricted track signal indication effects energization of the magnet valve device 175 (FIG. 1B) of the train control valve device 14. Upon deenergization of magnet valve device 175, fluid under pressure will be vented from the timing reservoir 199 and piston chamber 198 to atmosphere via the whistle 206 in the manner hereinbefore explained. The fluid under pressure in the timing reservoir 199 and piston chamber 198 is therefore gradually vented through the whistle 206 at a rate controlled by the choke 201 and after a predetermined time interval, determined by the volume of timing reservoir 199 with respect to the flow capacity of choke 201 and the whistle 206, the pressure in the chamber 198 acting on the valve piston 191 becomes sufficiently reduced for the spring 192 to move the valve piston 191 and the double beat valve 176 downward from the position shown until the valve piston 191 contacts a gasket 308 interposed between two casing sections of the sectionalized casing 178.

With the double beat valve 176 in its lower position, fluid under pressure is vented from the chamber 151 in the brake application valve device 13 and the timing reservoir 6 to the stop reservoir 181 via passageway 152, branch passageway and pipe 152a, pipe and passageway 238, chamber 225 in suppression valve device 15, bore 227, counterbore 228, past now unseated valve 219, chamber 218, passageway 237, pipe 187, now open cut-off valve 186, pipe and passageway 185, past double beat valve 176 now in its lower position, chamber 177, passageway and pipe 179 and pipe 182.

It will be noted from FIG. 1B that fluid under pressure may flow from the pipe 179 to atmosphere via check valve device 180, pipe 170, pipe and passageway 238a, chamber 225a in fluid pressure operated valve device 21, past now unseated valve 229a, chamber 231a and passageway 239a. Fluid under pressure from the chamber 151 in the brake application valve device 13 and the timing reservoir 6 is thus simultaneously vented to the stop reservoir 181 and to atmosphere through the fluid pressure operated valve device 21. Consequently, when the pressure in the chamber 151 is reduced sufficiently below the pressure acting in the chamber 148, the diaphragm 147 and thereby the application valve 141 will be moved upward against the yielding resistance of the spring 150 until a diaphragm follower 309 that clamps the diaphragm 147 to the application valve 141 contacts a stop 310 formed on the upper casing section of the sectionalized casing of the brake application valve device 13. Movement of the follower 309 into contact with the stop 310 defined the brake application position of the diaphragm 147 and application valve 141.

In the application position of the application valve 141, the lower groove 156 thereon no longer connects the passageway 163 to the passageway and pipe 162 and the right-hand end of this passageway 163 is blanked by the two lower O-rings 157 on the application valve 141. Since the left-hand end of the passageway 163 is connected by the groove 164 on the release control valve 143 to the passageway 165 that in turn is connected by the pipe 70 and the pipe and passageway 236 to the chamber 211a in the fluid pressure operated valve device 21, it is apparent that no fluid under pressure is released from the chamber 211a upon movement of the application valve 141 to its application position. Therefore, the valve 229a remains unseated from its seat 230a so that pipe and passageway 238a and bore 145 continue to be open to atmosphere via the passageway 239a.

Also, in the application position of the application valve 141, the lower end of this valve 141 uncovers the end of the branch passageway 152b that opens at the wall surface of the bore 145. Consequently, the chamber 151 is connected to the interior of this bore 145 via passageway 152 and branch passageway 152b. The lower end of this bore 145 is now vented to atmosphere via passageway and pipe 170, pipe and passageway 238a, chamber 225a in fluid pressure operated valve device 21, past unseated valve 229a, chamber 231a and passageway 239a. Therefore, fluid under pressure can be vented from the chamber 151 via the communication just described at a faster rate than fluid under pressure can be supplied from the main reservoir 3 through the choke 153 and the passageway 152 to this chamber 151.

Consequently, the application valve 141 can not be returned to its release position at this time by the flow of fluid under pressure from the main reservoir 3 through the choke 153 to the passageway 152 and thence to the chamber 151. Also, while the application valve 141 is in its application position, the groove 154 thereon establishes a communication between the branch passageway 149b and the passageway and pipe 158. Therefore, fluid under pressure from the main reservoir 3 will flow to the chamber 160 below the diaphragm 209 of the suppression valve device 15 via pipe 67, pipe and passageway 149, branch passageway 149b, groove 154, passageway and pipe 158 and passageway 212.

Accordingly, once the application valve 141 has moved to its application position in response to the more restricted track signal indication effecting deenergization of the magnet valve device 175, the engineer cannot suppress a train control application of brakes by moving the brake valve handle 24 into its application zone to release fluid under pressure from the equalizing reservoir 7 and the chamber 139 of the relay valve device 9 to cause this valve device 9 to release fluid under pressure from the brake pipe 1 and supply this fluid under pressure to the chamber 211 above the diaphragm 209 of the suppression valve device 15 via passageway and pipe 105, pipe tee 123, pipe 125, double check valve 18 and pipe and passageway 235 since the fluid under pressure present in the chamber 160 below this diaphragm 209 will prevent downward deflection of this diaphragm to effect seating of the valve 219 on its seat 221 to cut off flow of fluid under pressure from the chamber 151 in the brake application valve device 13 to the stop reservoir 181 the size of which is sufficient to cause the application valve 141 to be moved to its application position to cause a full service brake application when the chamber 151 is connected to this stop reservoir 181 past the double beat valve 176 in its lower position as the result of deenergization of the magnet valve device 175.

The supply of fluid under pressure to the chamber 160 in the suppression valve device 15 via the groove 154 on the application valve 141 in the manner described above insures that once the magnet valve device 175 is deenergized in response to a more restricted track signal indication and the application valve 141 has moved to its application position in which the groove 154 thereon connects branch passageway 149b to passageway and pipe 158, a full service brake application will be automatically effected and cannot be suppressed.

Upon movement of the application valve 141 to its application position, the groove 156 thereon cuts off passageway and pipe 162, which is connected to the equalizing reservoir 7 and the chamber 139 in the relay valve device 9 by the pipe 140, from the passageway 163 and connects the passageway and pipe 162 to a passageway 311 that extends through the sectionalized casing of the brake application valve device 13 to the exterior thereof and has a choke 312 disposed therein.

Therefore, upon the groove 156 thus connecting the passageway and pipe 162 to the passageway 311, fluid under pressure flows from the equalizing reservoir 7 and the chamber 139 to atmosphere via pipe 140, pipe and passageway 162, groove 156, passageway 311 and choke 312 the size of which is such as to restrict the rate of flow of fluid under pressure from the equalizing reservoir 7 and chamber 139 to a service rate.

All the fluid under pressure present in the equalizing reservoir 7 and the chamber 139 will now be released to atmosphere via the choke 312.

This release of fluid under pressure from the chamber 139 of the relay valve device 9 will cause it to operate in the manner hereinbefore described to unseat the exhaust valve 117 from its seat 98 whereupon all of the fluid under pressure present in the train brake pipe will flow to the passageway and pipe 122 and thence the atmosphere at a service rate via the choke 124 in the pipe tee 123. Consequently, the pressure in the train brake pipe will be reduced to zero.

The brake control valve device 10 and the relay valve device 12 will operate in response to the release of all fluid under pressure from the brake pipe 1 to effect the supply of fluid under pressure to the brake cylinder 2 to cause a full service brake application on the locomotive.

Likewise, the brake control valve device on each car in the train will operate in response to the release of all fluid under pressure from the train brake pipe to cause a full service brake application on each respective car.

It will be noted that since the choke 124 restricts the rate of flow of fluid under pressure from the pipes 122 and 125, some of the fluid under pressure flowing from the brake pipe 1 to the pipe 122 flows through the pipe 125 to the left-hand inlet of the double check valve device 18 and thence through this device 18 and the pipe and passageway 235 to the chamber 211 in the suppression valve device 15. The fluid under pressure thus supplied to the chamber 211 will be subsequently released therefrom to atmosphere via the choke 124 as the pressure in the brake pipe 1 and pipes 122 and 125 is reduced to zero via this choke 124.

It will be noted from FIGS. 1A and 1B of the drawings that the pipe 289 connects the pipe 288 to the right-hand inlet of the double check valve device 17 and that the outlet of this valve device 17 is connected to the right-hand inlet of the double check valve device 18 by the pipe 290. Therefore, some of the fluid under pressure supplied by the relay valve device 12 to the brake cylinder 2 will flow to the right-hand inlet of the double check valve device 18 via the pipe 289, double check valve device 17 and the pipe 290. Consequently, upon the pressure of the fluid in the pipe 125 being reduced by flow to atmosphere via the choke 124 to a value below that of the fluid at brake cylinder pressure present in the pipe 290, this fluid under pressure in the pipe 290 will shift a valve element 313 in this double check valve device 17 from its right-hand position in which it is shown to a left-hand position in which a communication is established between the pipe 290 and the pipe and passageway 235.

When the valve element 313 is thus shifted to its left-hand position, the fluid at brake cylinder pressure in the pipe 290 flows to the pipe and passageway 235 which opens into the chamber 211 in the suppression valve device 15. This fluid at brake cylinder pressure in the chamber 211 and acting downward on the diaphragm 209 is without effect because the fluid under pressure supplied from the main reservoir 3 to the chamber 160 upon movement of the application valve 141 of the brake application valve device 13 to its application position is acting upward on this diaphragm 209 at this time.

RECHARGE OF BRAKE PIPE TO EFFECT A RELEASE OF BRAKES SUBSEQUENT TO OPERATION OF THE BRAKE APPLICATION VALVE IN RESPONSE TO A MORE RESTRICTED TRACK SIGNAL INDICATION

In order to effect recharging of the brake pipe 1 following a reduction in pressure effected therein as the result of the automatic operation of the brake application valve device 13 in response to the train entering a block where there is a more restricted track signal indication, the magnet valve device 175 (FIG. 1B) must be energized in response to a clear track signal indication so as to seat the valve 241 and thereby close the vent communication between passageway 200 and whistle 206 and reestablish communication between pipe and passageway 205 and passageway 200 to recharge chamber 198 and timing reservoir 199 from the reducing valve device 204. This recharging of the chamber 198 and timing reservoir 199 causes the valve piston 191 and double beat valve 176 to move upward so that this valve 176 is seated on its upper seat thereby closing the communication between pipe and passageway 185 that is open to the chamber 151 in the brake application valve device 13 via the suppression valve device 15, and the passageway and pipe 179 which is connected to the stop reservoir 181 and is also open to atmosphere via check valve 180, pipe 170, pipe and passageway 238a, chamber 225a in the valve device 21, past now unseated valve 229a, chamber 231a and passageway 239a.

With double beat valve 176 thus seated on its upper seat, the fluid under pressure supplied from the main reservoir 3 through the choke 153 in the brake application valve device 13 to the passageway 152 can still flow to atmosphere via branch passageway 152b, bore 145, passageway and pipe 170, pipe and passageway 238a and the valve device 21. Therefore, the brake valve handle 24 (FIG. 1A) must be moved arcuately from its release position to its handle-off position to cause the self-lapping control valve device 22 of the brake valve device 8 to operate to release fluid under pressure from the passageway and pipe 70 which is connected to the chamber 211a in the valve device 21 by the pipe and passageway 236.

Upon the release of all of the fluid under pressure in the chamber 211a in the valve device 21, the spring 232a will seat the valve 229a on its seat 230a thereby cutting off the flow of fluid under pressure from the bore 145 in the brake application valve device 13 to atmosphere via the valve device 21.

The fluid under pressure supplied from the main reservoir 3 through the choke 153 will now flow to the chamber 151 via the passageway 152 to increase the pressure therein. When the force of the fluid under pressure in this chamber 151 and the force exerted by the spring 150 is substantially equal to the force of the fluid under pressure in the chamber 148, the spring 150 is rendered effective to move the application valve 141 downward to the position in which it is shown in FIG. 1B. In this position of the application valve 141, the groove 156 thereon connects the passageway and pipe 162, that is connected to the equalizing reservoir 7 (FIG. 1A) and the chamber 139 in the relay valve device 9 by the pipe 140, to the passageway 163 (FIG. 1B). The other end of this passageway 163 is connected by the groove 164 on the release control valve 143 to the passageway 165 to which is connected one end of the pipe 70 the opposite end of which is connected by the correspondingly numbered passageway to the delivery chamber 49 (FIG. 1B) in the self-lapping control valve device 22 of the brake valve device 8, it being noted that one end of the pipe 236 is connected to this pipe 70 intermediate the ends thereof.

Now to effect recharging of the brake pipe 1 and therefore, the train brake pipe, it is necessary that the engineer move the brake valve handle 24 (FIG. 1A) back to its release position.

When the handle 24 is returned to its release position, the self-lapping control valve device 22 will supply fluid under pressure to the passageway and pipe 70 from whence it will flow to, (1) the equalizing reservoir 7 and the chamber 139 in the relay valve device 9 via passageway 165, groove 164 on release control valve 143, passageway 163, groove 156 on application valve 141, passageway and pipe 162 and pipe 140, and (2) the chamber 211a in the valve device 21 via pipe and passageway 236.

The fluid pressure supplied to the chamber 139 will cause the relay valve device 9 to operate in the manner hereinbefore described to effect the supply of fluid under pressure from the main reservoir 3 to the brake pipe 1 to fully charge this pipe and the train brake pipe connected thereto.

The brake control valve device 10 and relay valve device 12 on the locomotive and the brake control valve on each car in the train will now operate in response to recharging the train brake pipe to effect a release of the brakes on the entire train.

The fluid under pressure supplied to the chamber 211a in the valve device 21 will deflect the diaphragm 209a downward to effect seating of valve 219a on its seat 221a and unseating of valve 229a from its seat 230a.

The unseating of the valve 229a opens a communication from the bore 145 in the brake application valve device 13 to atmosphere via the pathway hereinbefore described. This insures that when the brake application valve 141 is again moved to its application position in the manner previously described, the fluid under pressure supplied through the choke 153 to bore 145 will be vented to atmosphere to prevent a buildup of pressure in the chamber 151 to cause the application valve 141 to return to its release position prior to the engineer moving the handle 24 (FIG. 1A) of brake valve device 8 to its handle off position and then back to its release position to effect a release of an automatic train control brake application in the manner hereinbefore explained.

PERMANENT SUPPRESSION OF A TRAIN CONTROL BRAKE APPLICATION BY THE ENGINEER

When a track signal indication becomes more restricted and causes deenergization of the magnet valve device 175 (FIG. 1B), the track conditions may not be such as to require a full service reduction of the pressure in the train brake pipe and thereby a full service application of brakes on the locomotive and cars hauled thereby, and a stopping of the train. Also, any reduction of train brake pipe pressure in excess of that actually required represents an undesired and unnecessary loss of fluid under pressure and delay in subsequently recharging the train brake pipe to the normal pressure carried therein for causing a release of the brakes, and getting the train in motion again.

In other words, the more restricted track signal indication may only be momentary and change back to a clear track signal indication before either a full service reduction of the pressure in the train brake pipe has been completed or the train brought to a stop. Under such a condition, it is, therefore, desirable that the engineer be able to promptly release the brakes on the locomotive and cars in the train so that the train may continue its journey to the next terminal.

From the hereinbefore-described operation of the brake application valve device 13 in response to a more restricted track signal indication, it will, however, be remembered that once this brake application valve device moves to its application position, a reduction of brake pipe pressure less than a full service reduction cannot be prevented even though the more restricted track signal indication should change to a clear track signal indication before the reduction was completed. This is necessary to insure the safety of the train, but under a condition where such a reduction is not required, it is undesirable, as pointed out above.

If the engineer is alert, he may, however, prevent operation of the brake application valve device 13 in response to a change of a clear track signal indication to a more restricted signal indication and thus avoid a condition, such as that described, by operating the engineer's brake valve device 8 within a certain time interval after the whistle 206 starts to sound, to effect a full service reduction of the pressure in the train brake pipe and therefore, a full service brake application, as will now be described.

Assume that, while the apparatus is fully charged, the brake valve handle 24 (FIG. 1A) is in its release position and the train is running along the track, the train enters a block where there is a more restricted track signal indication. This more restricted track signal indication effects deenergization of the magnet valve device 175 (FIG. 1B). Deenergization of magnet valve device 175 enables spring 242 to unseat valve 241 whereupon fluid under pressure will be vented from the chamber 198 and timing reservoir 199 to atmosphere via the whistle 206 to sound an audible warning to warn the engineer that an automatic train control application of brakes will be effected automatically unless he demonstrates his alertness within a predetermined interval of time, such as 6 to 8 seconds, from the time the warning sound commences. This time interval is determined by the capacity of the timing reservoir 199 from which previously stored fluid under pressure will flow to atmosphere via the choke 201 and whistle 206.

If the warning sounds, the engineer must promptly demonstrate his alertness by moving the brake valve handle 24 (FIG. 1A) arcuately out of its release position into its application zone and to its full service position at the end of its application zone.

As the handle 24 is thus moved arcuately, it rotates the cam shaft 26 and cam 25 to thereby operate the self-lapping control valve device 22 to cause this valve device 22 to release fluid under pressure from the equalizing reservoir 7 and the chamber 139 in the relay valve device 9 to atmosphere in the manner hereinbefore explained until the pressure therein is reduced the required amount, for example, 20 pounds per square inch, to cause this relay valve device 9 to operate to effect a corresponding full service reduction of pressure in the train brake pipe.

As the pressure in the chamber 139 of the relay valve device 9 is thus reduced, this relay valve device 9 operates in the manner hereinbefore described to unseat its exhaust valve 117 to thereby permit fluid under pressure to flow from the brake pipe 1 to the passageway and pipe 122 and thence to atmosphere via the choke 124, and also to the chamber 211 in the suppression valve device 15 via the pipe 125, double check valve device 18, and pipe and passageway 235.

The strength of the spring 214 in the suppression valve device 15 is so selected that a full service reduction of pressure in the train brake pipe, the aforementioned reduction of twenty pounds per square inch must be effected before sufficient pressure is built up in the chamber 211 of this suppression valve device 15 to deflect the diaphragm 209 downward to effect seating of valve 219 on its seat 221 to cut off communication between the chamber 151 in the brake application valve device 13 and the magnet valve device 175 to suppress an automatic train control brake application. If a lighter spring were used so that an automatic train control brake application could be suppressed by effecting a partial or less than a full service brake application, and the train is operated at a high speed in a territory where the wayside track signals were comparatively close together, a sufficiently heavy brake application would not be effected by the time the train reached the next or second wayside track signal to insure that the speed of the train was reduced sufficiently to enable the engineer to completely stop the train before it enters the next block occupied by a train ahead in this block.

As the pressure in the train brake pipe is reduced by flow of fluid under pressure from the brake pipe 1 to atmosphere via the open exhaust valve 117 of the relay valve device 9 and the choke 124 until a full service reduction of 20 pounds per square inch is effected in the train brake pipe the brake control valve device 10 (FIG. B) and the relay valve device 12 on the locomotive and the brake control valve device on each car in the train operate in response to this full service reduction of pressure in the train brake pipe to effect a full service brake application on the locomotive and each car in the train.

Referring to FIGS. 1A and 1B, it will be seen that some of the fluid under pressure supplied by the relay valve device 12 to the brake cylinder 2 via the pipe 288 flows from this pipe 288 (FIG. 1B) to the right-hand inlet of the double check valve device 18 (FIG. 1A) via the pipe 289 which is connected to the right-hand inlet of the double check valve device 17, this valve device 17 and the pipe 290. It may be seen from FIG. 1A that one end of the pipe 125 is connected to the left-hand inlet of the double check valve device 18 and the opposite end of this pipe 125 is open to atmosphere via the choke 124 in the pipe tee 123. Therefore, subsequent to the exhaust valve 117 of the relay valve device 9 seating on its seat 98 to cut off further flow of fluid under pressure from the brake pipe 1 to the passageway and pipe 122 and thence to the pipe 125, fluid under pressure present in this pipe 125 will flow to atmosphere via a choke 124 at a rate determined by the size of this choke 124.

Accordingly, it is apparent that when the pressure in the pipe 125 has fallen to a valve only slightly less than the brake cylinder pressure present in the pipe 290, this higher brake cylinder pressure will shift the valve element 313 of the double check valve device 18 in the direction of the left hand, as viewed in FIG. 1A, until a communication is established between the pipe 290 and the pipe 235 via this double check valve device 18.

When a communication is thus established between the pipes 290 and 235, fluid under pressure at brake cylinder pressure will flow from the pipe 290 to the chamber 211 (FIG. 1B) in the suppression valve device 15. This pressure in the chamber 211 and acting downward on the diaphragm 209 of this suppression valve device 15 is effective to maintain valve 219 seated on its seat 221 and thereby maintaining the brake application valve device 13 cut off from the magnet valve device 175. Thus, an automatic train control brake application by operation of the brake application valve device 13 is permanently suppressed or prevented until fluid under pressure is released from the brake cylinder 2 and the chamber 211 in the suppression valve device 15 in response to operation of the brake control valve device 10 and the relay valve device 12 to effect a brake release on the locomotive.

CUT OUT OF AN AUTOMATIC TRAIN CONTROL BRAKE APPLICATION

When a locomotive provided with the apparatus shown in FIGS. 1A and 1B is not the lead unit in multiple unit operation or is a pusher, the magnet valve device 175 remains deenergized since the lead unit shunts out the track signal circuit that effects energization of this magnet valve device 175. Therefore, the double beat valve 176 remains in its lower position to connect pipe and passageway 185 to the stop reservoir 181 via a passageway and pipe 179 and pipe 182. Accordingly, when the locomotive is not the lead unit in multiple unit operation or is a pusher, the rotary plug 244 (FIG. 1A) of the three-way cut-out valve 16 is manually rotated by a handle (not shown) from the position shown to a second position in which the passageway 246 in this rotary plug 244 establishes a communication from the pipe 247 to the pipe 248.

Upon thus establishing a communication between pipes 247 and 248, fluid under pressure will flow from the main reservoir 3 to the chamber 211 in the suppression valve device 15 via pipes 67 and 247, passageway 246 in plug 244, pipe 248, double check valve device 17, pipe 290, double check valve device 18, and pipe and passageway 235. Thus, the valve 219 is maintained seated on its seat 221 to close communication between the chamber 151 in brake application valve device 13 and the pipe and passageway 185 in the train control valve device 15.

As shown in FIG. 1A, one end of the pipe 260 is connected to the pipe 248 intermediate the ends thereof. Therefore, when the rotary plug 244 is moved to the position to supply fluid under pressure from the main reservoir 3 to the pipe 248, some of this fluid under pressure will flow from the pipe 248 to the chamber 259 in the charging cut-off valve device 19 via the pipe and passageway 260.

Fluid under pressure thus supplied to the chamber 259 is effective to move the piston 256 to the position shown in FIG. 1A in which it abuts the bottom of the counterbore 257. In this position of the piston 256, the spring 270 is effective to bias the disc valve 267 against the valve seat 252.

With the valve 267 biased against the valve seat 252, communication is closed between the relay valve device 9 and the brake pipe 1. Accordingly, should a break-in-two of the train occur, or the hose between any two cars become ruptured, so that fluid under pressure is vented from the train brake pipe at an emergency rate, the relay valve device 9 on this locomotive is ineffective to supply fluid under pressure to the train brake pipe upon the release of fluid under pressure from the train brake pipe at an emergency rate as the result of the break-in-two or ruptured hose.

When a locomotive provided with the brake control apparatus shown in FIGS. 1A and 1B is the lead unit in multiple unit operation and a break-in-two or a hose rupture occurs between any two cars in the train, the charging cut-off valve device 20 (FIG. 1B) operates in response to the resulting release of fluid under pressure from the train brake pipe at an emergency rate in the manner explained in hereinbefore-mentioned U.S. Pat. No. 3,749,453, to effect the supply of fluid under pressure to the chamber 259 in the charging cut-off valve device 19.

This supply of fluid under pressure to the chamber 259 is effective to move the piston 256 to the position shown in FIG. 1A so that the spring 270 biases the valve 267 against its seat 252 thereby closing communication between the relay valve device 9 and the brake pipe 1 to prevent further supply of fluid under pressure to the brake pipe 1 by operation of the relay valve device 9.

Having now described the invention, what we claim as new and desire to secure by Letters Patent, is:

1. In a locomotive brake control apparatus having a fluid pressure operated brake applying means, a normally charged brake pipe, a brake control valve means operatively responsive to a decrease in the pressure in the brake pipe to cause the supply of fluid under pressure to the brake applying means and to an increase in the pressure in the brake pipe to cause the release of fluid under pressure from the brake applying means, a main reservoir, an equalizing reservoir, a stop reservoir, a manually operative engineer's brake valve device having a self-lapping control valve means for controlling the pressure in the equalizing reservoir, a self-lapping relay valve means operative by variations of pressure in the equalizing reservoir to correspondingly control the pressure in the brake pipe, a fluid pressure operated brake application valve device having a normal position in which it establishes a charging communication via which the equalizing reservoir is charged by the self-lapping control valve means to cause operation of the relay valve means to supply fluid under pressure to the brake pipe to increase the pressure therein to effect a release of the brakes and movable therefrom to an application position in which it cuts off the supply of fluid under pressure from the self-lapping control valve means to the equalizing reservoir and establishes a venting communication via which the equalizing reservoir is vented to atmosphere to cause operation of the relay valve means to release fluid under pressure from the brake pipe to decrease the pressure therein to effect an application of the brakes and an electro-responsive valve means operative automatically in response to a change in a track signal indication to a more restrictive indication to release fluid under pressure from the fluid pressure operated brake application valve device to the stop reservoir to effect movement of this valve device from its normal position to its application position, wherein the improvement comprises:

a. a first fluid pressure operated valve means interposed between the brake application valve device and the electro-responsive valve means, this first valve means having a first position in which fluid under pressure may flow from the brake application valve device to the electro-responsive valve means and operable by fluid under pressure supplied thereto to a second position in which it prevents said flow, b. a first double check valve device having a pair of inlets and an outlet, c. a first conduit connecting said outlet to said first fluid pressure operated valve means, d. a second conduit connecting the fluid pressure operated brake applying means to one of said pair of inlets through which fluid under pressure supplied to the brake applying means may flow to said first fluid pressure operated valve means via said first double check valve device and said first conduit, e. a third conduit connecting the self-lapping relay valve means to the other of said pair of inlets through which fluid under pressure released from the brake pipe by operation of the relay valve means to decrease the pressure in the brake pipe may flow to said first fluid pressure operated valve means via said first double check valve means and said first conduit, and f. choke means in said third conduit for releasing fluid under pressure therefrom to atmosphere whereby, upon the pressure in said third conduit decreasing to a valve less than the pressure in the brake applying means and said second conduit, fluid under pressure flows from second conduit to said first fluid pressure operated valve means to maintain it in its said second position until fluid under pressure is released from said brake applying means by operation of the brake control means in response to an increase in the pressure in the brake pipe.

2. A locomotive brake control apparatus, as recited in claim 1, further characterized in that a second fluid pressure operated valve means has a first position for releasing fluid under pressure from said fluid pressure operated brake application valve device while in its said application position to atmosphere to prevent the return thereof to its normal position and a second position for preventing the release of said fluid under pressure from said brake application valve device to provide for the return of said application valve device from its said application position to its said normal position, and in that the self-lapping control valve means of the engineer's brake valve device controls the pressure of the fluid for operating said second fluid pressure operated valve means.

3. A locomotive brake control apparatus, as recited in claim 1, further comprising:

a. a second double check valve device having a pair of inlets and an outlet, one of said pair of inlets having said second conduit connected thereto and said outlet being connected to said one inlet of said first double check valve device, b. a fourth conduit connected to the other of said pair of inlets of said second double check valve device, and c. means for controlling the flow of fluid under pressure to said fourth conduit whereby said first fluid pressure operated valve means may be maintained in its second position in the absence of pressure in both said third conduit and said brake applying means.

4. A locomotive brake control apparatus, as recited in claim 1, further characterized in that said choke means is of such a size as to provide for the release of fluid under pressure from the brake pipe at a service rate upon operation of said relay valve means to decrease the pressure in the brake pipe.

5. A locomotive brake control apparatus, as recited in claim 1, further characterized by manually operable valve means interposed between said first fluid pressure operated valve means and said electro-responsive valve means and operable to cut off flow of fluid under pressure therebetween.

6. A locomotive brake control apparatus as recited in claim 2, further characterized by conduit means enabling flow of fluid under pressure from said stop reservoir to atmosphere via said second fluid pressure operated valve means while it is in its said first position.

7. A locomotive brake control apparatus, as recited in claim 3, further characterized in that said means for controlling the flow of fluid under pressure to said fourth conduit comprises a manually operable valve means.

8. A locomotive brake control apparatus, as recited in claim 3, further comprising:

a. a fluid pressure operated brake pipe cut-off valve device interposed between the relay valve means and the brake pipe and operable by fluid under pressure supplied thereto to prevent flow of fluid under pressure from the relay valve means to the brake pipe, and b. a fifth conduit through which fluid under pressure supplied to said fourth conduit may flow to said brake pipe cut-off valve device for effecting operation thereof to prevent flow of fluid under pressure from the relay valve means to the brake pipe.

9. A locomotive brake control apparatus, as recited in claim 8, further characterized by a fluid pressure operated valve means operable in response to the release of fluid under pressure from the brake pipe at an emergency rate to effect the supply of fluid under pressure to said fifth conduit to cause operation of said brake pipe cut-off valve device to prevent flow of fluid under pressure from the relay valve means to the brake pipe, the fluid under pressure supplied to said fifth conduit flowing therefrom to said first fluid pressure operated valve means via said fourth conduit, both of said double check valve devices and said first conduit to maintain said first fluid pressure operated valve means in its second position.

* * * * *

UNITED STATES PATENT OFFICE
CERTIFICATE OF CORRECTION

PATENT NO. : 4,013,322
DATED : March 22, 1977
INVENTOR(S) : Robert J. Worbois and John R. Reiss It is certified that error appears in the above-identified patent and that said Letters Patent are hereby corrected as shown below:

Column 29, line 26, after "means" insert --disposed-- line 29, change "valve" to --value-- line 31, after "from" insert --said--

Signed and Sealed this

First Day of November 1977

[SEAL]

Attest:

RUTH C. MASON
Attesting Officer

LUTRELLE F. PARKER
Acting Commissioner of Patents and Trademarks